(12) United States Patent
Kobayashi

(10) Patent No.: US 6,670,294 B2
(45) Date of Patent: Dec. 30, 2003

(54) CORROSION-RESISTIVE CERAMIC MATERIALS AND MEMBERS FOR SEMICONDUCTOR MANUFACTURING

(75) Inventor: Hiromichi Kobayashi, Yokkaichi (JP)

(73) Assignee: NGK Insulators, Ltd., Nagoya (JP)

( * ) Notice: Subject to any disclaimer, the term of this patent is extended or adjusted under 35 U.S.C. 154(b) by 29 days.

(21) Appl. No.: 10/055,724

(22) Filed: Jan. 23, 2002

(65) Prior Publication Data

US 2002/0155940 A1 Oct. 24, 2002

(30) Foreign Application Priority Data

Jan. 25, 2001 (JP) .................................... 2001-017391

(51) Int. Cl.$^7$ ..................... C04B 35/569; C04B 35/587
(52) U.S. Cl. ........................... 501/88; 501/90; 501/92; 501/91; 501/97.1; 501/97.2; 501/97.3
(58) Field of Search ......................... 501/88, 89, 90, 501/91, 92, 97.1, 97.2, 97.3, 97.4

(56) References Cited

U.S. PATENT DOCUMENTS

| | | | | |
|---|---|---|---|---|
| 5,589,116 A | * | 12/1996 | Kojima et al. ............... | 264/65 |
| 5,942,454 A | * | 8/1999 | Nakayama et al. ............ | 501/88 |
| 6,001,756 A | * | 12/1999 | Takahashi et al. ............ | 501/90 |
| 6,013,236 A | * | 1/2000 | Takahashi et al. ........... | 423/345 |
| 6,217,969 B1 | * | 4/2001 | Takahashi et al. .......... | 428/64.1 |
| 6,258,741 B1 | * | 7/2001 | Kohsaka et al. ............... | 501/87 |
| 6,387,834 B1 | * | 5/2002 | Odaka et al. .................. | 501/88 |
| 6,419,757 B2 | * | 7/2002 | Otsuki et al. .................. | 134/26 |

FOREIGN PATENT DOCUMENTS

| | | | |
|---|---|---|---|
| JP | 05-228386 | * | 9/1993 |
| JP | 06-345412 | * | 12/1994 |
| JP | 2001-130971 | * | 5/2001 |

* cited by examiner

*Primary Examiner*—Karl Group
(74) *Attorney, Agent, or Firm*—Burr & Brown

(57) ABSTRACT

Corrosion-resistive ceramic materials include a silicon based ceramic, wherein a percentage of respective metal elements other than metal elements constituting sintering agents and silicon is not more than 10 weight ppm. The corrosion-resistive ceramic materials show a high corrosion resistance with respect to corrosive substances and suppress particle generation due to an exposure to corrosive substances. Therefore, chippings and cracks do not occur easily during machining work.

6 Claims, No Drawings

CORROSION-RESISTIVE CERAMIC MATERIALS AND MEMBERS FOR SEMICONDUCTOR MANUFACTURING

BACKGROUND OF THE INVENTION (1) Field of the Invention

The present invention relates to high-purity and corrosion-resistive ceramic materials, method of producing the same, and members for semiconductor manufacturing which utilize the ceramic materials.

(2) Related Art Statement

In accordance with an increase of memory capacities in super LSI, micro-fabrication technique has been progressed, so that processes requiring chemical reactions have been widely used. Particularly, halogen-based gases such as chlorine-based gases and fluorine-based gases are used as a deposition gas, an etching gas or a cleaning gas in the semiconductor manufacturing apparatus requiring a super clean state.

In the semiconductor manufacturing apparatus such as a hot CVD apparatus as a heater for heating a wafer in contact with such a corrosive gas, the semiconductor cleaning gas of a halogen-based corrosive gas such as $ClF_3$, $NF_3$, $CF_4$, HF or HCl is used after the deposition. During the deposition, another halogen-based gas such as $WF_6$ or $SiH_2Cl_2$ is also used as a film-forming gas.

Since silicon nitride is a compound containing Si as a main component constituting wafers, silicon nitride is used for members in semiconductor manufacturing apparatuses, particularly chambers, together with Si, $SiO_2$ and SiC.

Up to now, as a chamber member used in the semiconductor manufacturing apparatuses, use is made of silicon or quartz glass. However, since silicon and quartz glass become high purity but have a low fracture toughness, chipping and cracks easily occur on their surfaces during a machining work, and thus this causes a generation of particles. Moreover, in the semiconductor manufacturing apparatuses, respective members are exposed to halogen-based corrosive gases or its plasma. For example, in the ether, corrosion of the members is accelerated with ion bombardment, or a component in the member is sputtered with plasma ion bombardment, thereby causing pollution of the wafers. Since a design rule approaches 0.1 $\mu$m, such problems become more elicit than before. Moreover, in the present states, life of the members made of silicon or quartz glass is short. Further, the present applicant disclosed in JP-A-5-251365 that is a silicon nitride sintered body is exposed to a $ClF_3$ gas at high temperatures, its surface state changes to generate particles.

SUMMARY OF THE INVENTION

An object of the invention is to provide corrosion-resistive materials used suitably for an application exposing to a corrosive gas such as members for semiconductor manufacturing, which achieve high corrosion resistance and decrease of particle generation due to an exposure to a corrosive gas, and wherein chippings and cracks do not occur easily during a machining work.

According to the invention, corrosion-resistive ceramic materials which are to be exposed to a corrosive gas comprise a ceramic including silicon atom wherein a percentage of respective metal elements other than metal elements constituting sintering agents and silicon atom is not more than 10 weight ppm.

Moreover, according to the invention, a method of producing the corrosion-resistive ceramic materials mentioned above comprises the steps of: preparing raw materials wherein a percentage of respective metal elements other than metal elements constituting sintering agents and silicon atom is not more than 10 weight ppm; and mixing the thus prepared raw materials by means of balls to which resins are coated. Further, according to the invention, members for semiconductor manufacturing comprise a base member made of the corrosion-resistive ceramic materials mentioned above.

The present inventors found that if silicon atom used as a main metal element of ceramic and a percentage of respective impurity metal elements in ceramic is made not more than 10 weight ppm, the corrosion resistance with respect to corrosive substances, particularly halogen-based corrosive gas or its plasma, is extremely improved and particle generation is decreased, thereby reaching to the present invention.

The corrosion resistance of the members according to the invention is extremely high as compared with, for example, quartz glass or silicon, and is also extremely high as compared with a normal silicon nitride sintered body or a silicon carbide sintered body. Such a relationship between a low amount of impurity metal elements and the corrosion resistance with respect to halogen-based corrosive gases or their plasmas has not been discussed up to now.

In addition, since the members according to the invention are made of a ceramic including silicon atom as a main metal component, chippings and cracks do not occur easily during machining, and thus it is possible to prevent particle generation due to chippings.

Further, since the members according to the invention are made of a ceramic including silicon atom as a main metal component and the percentage of impurity metal elements other than silicon atom and metal atoms constituting sintering agents is low, there is no fear of polluting the inside of the semiconductor manufacturing apparatus.

The kind of ceramic including silicon atom as a main metal elements is not limited, but it is preferred to use a ceramic such as silicon nitride, silicon carbide and sialon, particularly silicon nitride and silicon carbide.

As metal elements constituting sintering agents, use is made of magnesium, silicon, yttrium, zirconium, elements belonging to lanthanide series, ytterbium and cerium.

In the preferred embodiment, a silicon nitride sintered body is used and the metal elements constituting sintering agents are selected from a group of magnesium, silicon, yttrium, zirconium and elements belonging to lanthanide series. If these metal elements are included, it is possible to decrease the corrosion of the corrosion-resistive ceramic materials more and more. As the metal elements mentioned above, use may be made of metal elements which react with the halogen and form a stable haloid. Here, lanthanide series means La, Ce, Pr, Nd, Pm, Sm, Eu, Gd, Tb, Dy, Ho, Er, Tm, Yb and Lu.

Particularly, it is further preferred to use (heavy) elements having a larger atomic weight (such as Sr, Y, and lanthanide elements).

Among the metal elements mentioned above, it is further preferred to use one or more elements selected from a group of magnesium, yttrium, ytterbium, cerium, samarium and lanthanum.

It is most preferred to include the metal elements mentioned above in the form of oxide, but it may be possible to include them in the form of element itself or nitride.

In the silicon nitride sintered body, if an amount of additives is too large, a so-called boundary phase is precipitated to a level such that it is easily detected by XRD, and selective corrosion due to the difference in the etch rate between the boundary and the silicon nitride particle is promoted. As a result, particle pollutions easily occur, and the rate of being sputtered by ion bombardment becomes larger. Moreover, since the thermal expansion coefficient becomes larger, the positional relation with respect to the wafer is varied in response to a variation of thermal expansion coefficient when heated, and thus, the yield ratio of manufacturing devices becomes worse. Therefore, it is preferred that the amount of metal elements constituting sintering agents (preferably metal elements selected from a group of magnesium, silicon, yttrium, zirconium and elements belonging to lanthanide series) is not more than 15 mol % with respect to 1 mol of ceramic as calculated in the form of metal elements. This amount is further preferred to be not more than 12 mol %.

Moreover, in the case of adding sintering agents, it is preferred that the amount of metal elements constituting sintering agents (preferably metal elements selected from a group of magnesium, silicon, yttrium, zirconium and elements belonging to lanthanide series) is not less than 1.0 mol % with respect to 1 mol of ceramic as calculated in the form of metal elements.

In the silicon nitride sintered body, an amount of metal elements other than the metal elements constituting sintering agents is set to be not more than 10 weight ppm respectively.

More preferably, a total amount of elements in Group 1a and elements in Group 4a–3b of the Periodic Table is not more than 50 weight ppm.

The elements in Group 1a of the Periodic Table are Li, Na, K, Rb and Cs. The elements in Group 4a–3b are Ti, Zr, Hf, V, Nb, Ta, Cr, Mo, W, Mn, Re, Fe, Ru, Ir, Ni, Pd, Pt, Ag, Au, Zn, Cd, Hg, B, Al, Ga, In and Tl.

It is known that the alkaline elements (Group 1a) and those in Groups 4a–2b afford adverse effects upon the wafer process. However, the present inventors found that the elements in Group 3b such as Al are unfavorable as a component for the corrosive-resistive members. That is, if the elements in Group 3b are incorporated into the silicon nitride sintered body, the elements are likely to be sputtered and may be adhered to the wafers upon receipt of ion bombardment. Such adhesion causes metal contamination or poor etching.

Moreover, in the preferred embodiment, ceramic is the silicon carbide sintered bodies. Particularly, it is most preferred that the silicon carbide sintered body includes carbon and boron carbide or boron nitride. In this case, corrosion resistance with respect to corrosive substances can be further improved.

It is preferred to set an amount of carbon in the silicon carbide sintered body to 0.5–2.0 weight %. Moreover, it is preferred to set a total amount of boron carbide and boron nitride to 0.5–2.0 weight %.

Also in the silicon carbide sintered body, it is necessary to set an amount of respective metal elements other than those consisting of sintering agents to 10 weight ppm or less.

Also in the silicon carbide sintered body, it is preferred to set a total amount of the elements in Group 1a and the elements in Groups 4a–3b of the Periodic Table to 50 weight ppm or less. The elements in Groups 1a and 4a–3b are explained above.

In the present invention, a method of producing corrosion-resistive materials is not limited. As one of the producing methods, the corrosion-resistive ceramic materials can be produced as follows. That is, high purity powders such as silicon nitride powders, silicon carbide powders and so on are prepared. The thus prepared high purity powders are mixed to obtain raw material powders. In this case, sintering agents may be added if necessary.

Then, the thus obtained raw material powders are sintered under an uniaxial pressure, while being surrounded with carbon having an ash amount of 0.5 weight % or less in an atmosphere of 1–5 atm in $N_2$ pressure in the case of silicon nitride producing or in an atmosphere of 1–5 atm in Ar pressure in the case of silicon carbide producing, thereby obtaining a sintered body. The sintered body is worked in such a manner that the pressurized face of the sintered body becomes a corrosion-resistive face, thereby obtaining a corrosion-resistive member.

In this manner, it is necessary to use high purity powders and to control in such a manner that no impurity metal elements are included therein at all the producing processes.

However, the present inventors found the following phenomena. That is, even if attention is taken to all the producing processes in such a manner that impurity metal elements are not included therein, it is difficult to control an amount of respective impurity metal elements in the sintered body to a level of 10 weight ppm or less.

The present inventors discussed this phenomena and found that a slight amount of respective impurity metal elements is added into a formed body from the balls during the mixing process and remains in the sintered body, thereby exceeding 10 weight ppm of impurity metal elements. That is to say, use is made of silicon nitride balls when producing the silicon nitride sintered body, and also use is made of silicon carbide balls when producing the silicon carbide sintered body. However, theses balls themselves are a sintered body and it is necessary to add some kinds of additives so as to reduce porosity and to obtain a dense body. Therefore, it is assumed that a little part of the components in these balls moves into the raw material powders during the mixing process.

In order to remove this drawback, the present inventors try to coat the balls with resins. As a result, it is found that an amount of respective impurity metal elements is not increased in the sintered body and it can be controlled to a level of 10 weight ppm or less.

Resins used for coating the balls are not limited, but it is preferred for example to use nylon.

The main body of the ball to be coated with resins is not limited, but it is preferred to use balls made of, for example, steel, carbon or polymer materials.

Moreover, it is preferred to coat at least inner faces of a mill to be used during the mixing process. As such a mill, use is made of trommel, attrition mill and so on. Moreover, as the resins for coating, it is possible to utilize resins used for coating the balls as mentioned above.

It is preferred to use silicon nitride raw materials as the α type. The α type can be easily obtained at a high purity. As a target, a total amount of elements in Groups 1a and 4a–3b is preferably not more than 200 weight ppm. An average particle size of the raw materials is preferably not more than 1 μm.

Incorporation of a slight amount of chlorine or fluorine into the raw material powders is effective for making the sintered body more pure. Chlorine and/or fluorine is preferably contained in a total amount of 20–1000 weight ppm. Neither chlorine nor fluorine is necessarily contained in the raw materials, and they may be added externally to the raw materials as additives.

The addition method of the sintering agents may be selected appropriately, and their oxide powders are easily available. Other than oxide, use may be made of compositions generating oxides by heat (precursor of oxide) such as nitrate, sulfate, oxalate and alkoxide. Moreover, the compositions such as alkoxide are dissolved into a solvent so as to obtain a solution, and then the thus obtained solution may be added into the raw material powders.

The raw material powders are mixed and granulated by appropriate methods, and molded for example by the mold press method to obtain a formed body. The thus obtained formed body is enclosed with a high purity carbon sheet, which is sintered at about 1700–1900° C. under a $N_2$ pressure of 1–5 atm according to the hot press method. After the sintered bodies are obtained, they are worked into desired shapes by various working methods in such a manner that their main planes may be exposed faces.

A carbon member such as the carbon sheet or the activated carbon has preferably an she amount of not more than 0.5 wt %, more preferably not more than 10 weight ppm.

The corrosion-resistive ceramic materials according to the invention are applicable to various articles. As such articles, mention may be made of electromagnetic wave transmission windows, high frequency electrode devices, high frequency plasma-generating tubes and high frequency plasma-generating domes. Moreover, the corrosion-resistive ceramic materials according to the invention may be used as a substrate for a susceptor upon which a semiconductor wafer is mounted. As such a susceptor, ceramic electrostatic chucks, ceramic heaters and high frequency electrodes may be recited. Moreover, the corrosion-resistive ceramic materials according to the invention may be used as substrates for various semiconductor manufacturing apparatuses, including rings such as shadow rings, chamber liners, gas shower plates, nozzles, dummy wafers, lift pins for supporting semiconductor wafers, shower plates and so on.

The corrosive gases to which the corrosion-resistive ceramic materials according to the invention are exposed are not limited, but a halogen-based corrosive gas or its plasma is preferred. Chlorine-based or fluorine-based gases or their plasmas are particularly preferred. As the chlorine-based gases, Cl2, BCl3, ClF3 and HCl may be recited. As the fluorine-based gases, ClF3, NF3, CF4 and WF6 may be recited.

[Experiment]

COMPARATIVE EXAMPLE 1

A specimen made of commercially available metal silicon was prepared.

COMPARATIVE EXAMPLE 2

A specimen made of commercially available quartz glass was prepared.

COMPARATIVE EXAMPLE 3

With respect to 100 parts by weight of silicon nitride powders having an average particle size of 0.5 μm and a purity of 99.9%, 4.1 parts by weight of yttria and 16.7 parts by weight of ytterbia were added and they were mixed in trommel with water for 8 hours by using silicon nitride balls having a diameter of 5 mm, so as to obtain a mixture. Then, the mixture was dried by means of a spray dryer so as to obtain granulated powders. Then, the thus obtained granulated powders were pressed under an applying pressure of 200 kgf/cm$^2$ by means of a mold press so as to obtain a formed body. After the formed body was enclosed with a carbon sheet and inserted into a carbon mold, the formed body was sintered at 1900° C. in nitrogen atmosphere of 2 atm according to the hot press method. During the hot pressing, a keep time was 3 hours and an applied pressure was 20 MPa. As the carbon sheet, use was made of graphite having an ash amount of less than 10 ppm (Al<1 ppm, Ti<2 ppm, Mg<8 ppm and Co<1 ppm).

In this case, an amount of respective impurity metal elements in the silicon nitride powders was not more than 10 weight ppm, and a total amount of all the impurity metal elements was not more than 100 weight ppm.

EXAMPLE 1

In the comparative example 1, use was made of the steel balls to which nylon was coated, and an inside of the trommel was also coated with nylon. Except for the differences mentioned above, the silicon nitride sintered body was produced as is the same manner as that of the comparative example 1.

EXAMPLES 2–9

As is the same as the example 1, the silicon nitride sintered bodies were produced. However, in the examples 2–9, a kind and rate of sintering agents (additives), a sintering method and sintering conditions were varied respectively. They were shown in the following Table 2–Table 4.

TABLE 1

|  | Comparative Example 1 | Comparative Example 2 | Comparative Example 3 | Example 1 |
| --- | --- | --- | --- | --- |
| Basic material | Si | SiO$_2$ | silicon nitride | silicon nitride |
| Additives | — | — | Y$_2$O$_3$ 4.1 weight % Yb$_2$O$_3$ 16.7 weight % | Y$_2$O$_3$ 4.1 weight % Yb$_2$O$_3$ 16.7 weight % |
| Balls | — | — | silicon nitride ball | nylon coating |
| Inside of trommel | — | — | no coating | nylon coating |
| Sintering method | — | — | hot press | hot press |
| Sintering temperature (° C.) | — | — | 1900 | 1900 |
| Keeping time during sintering | — | — | 3 | 3 |

TABLE 2

|  | Example 2 | Example 3 | Example 1 |
| --- | --- | --- | --- |
| Basic material | silicon nitride | silicon nitride | silicon nitride |
| Additives | MgO 1.0 weight % | SrO 1.0 weight % MgO 4.0 weight % CeO$_2$ 5.0 weight % | Y$_2$O$_3$ 6.0 weight % ZrO$_2$ 0.5 weight % MgO 4.0 weight % |
| Balls | nylon coating | nylon coating | nylon coating |
| Inside of trommel | nylon coating | nylon coating | nylon coating |
| Sintering method | hot press | hot press | hot press |

TABLE 2-continued

|  | Example 2 | Example 3 | Example 1 |
|---|---|---|---|
| Sintering temperature (° C.) | 1800 | 1720 | 1800 |
| Keeping time during sintering | 6 | 2 | 2 |

TABLE 3

|  | Example 5 | Example 6 | Example 7 |
|---|---|---|---|
| Basic material | silicon nitride | silicon nitride | silicon nitride |
| Additives | $SiO_2$ 6.0 weight % | $Sc_2O_3$ 5.0 weight % | $CeO_2$ 5.0 weight % |
| Balls | nylon coating | nylon coating | nylon coating |
| Inside of trommel | nylon coating | nylon coating | nylon coating |
| Sintering method | HIP | hot press | hot press |
| Sintering temperature (° C.) | 1900 | 1800 | 1900 |
| Keeping time during sintering | 2 | 2 | 2 |

TABLE 4

|  | Example 8 | Example 9 |
|---|---|---|
| Basic material | silicon nitride | silicon nitride |
| Additives | $Dy_2O_3$ 5.0 weight % | $Y_2O_3$ 2.0 weight % |
| Balls | nylon coating | nylon coating |
| Inside of trommel | nylon coating | nylon coating |
| Sintering method | hot press | hot press |
| Sintering temperature (° C.) | 1900 | 1900 |
| Keeping time during sintering | 2 | 6 |

(Estimations)

With respect to respective sintered bodies, an amount of respective metal elements was measured by glow discharge mass spectrometry. The results were shown in the following Table 5–Table 8. Moreover, a bulk density of respective sintered bodies was measured by Archimedes method. Further, a four-points flexural strength of respective sintered bodies at room temperature was measured according to JIS R 1601.

Moreover, respective sintered bodies was cut out into planar specimen having a dimension of 20 mm long, 20 mm wide and 5 mm thick, and then a corrosion test with respect to fluorine-based gasses was performed thereto.

Specifically, $NF_3$ gas and Ar were flowed respectively at 100 sccm (chamber pressure: 0.1 torr) and converted to plasma with inductively couples plasma (ICP) (13.56 MHz, 800 W). At the same time, a bias of 13.56 MHz and 300 W was applied to a sample stage having a diameter of 200 mm, and thus ion bombardment was applied thereto. In this case, the planar specimen mentioned above was mounted on the sample stage. At that time, a temperature of the sample stage was about 350° C. and a bias voltage Vdc was about 400 V.

A corrosion speed was calculated by a unit (μm/hr) in such a manner that the measured $NF_3$ corrosion weight reduction was divided by a density of the sintered body.

TABLE 5

|  |  | Example 2 | Example 3 | Example 4 |
|---|---|---|---|---|
| Impurity metal (weight ppm) | Na | 1 | 1 | 1 |
|  | Al | 10 | 10 | 10 |
|  | K | 3 | 4 | 3 |
|  | Ca | 6 | 4 | 4 |
|  | Ti | <1 | <1 | <1 |
|  | V | <0.1 | <0.1 | <0.1 |
|  | Cr | 1 | 5 | 5 |
|  | Mn | <0.1 | <0.1 | <0.1 |
|  | Fe | 3 | 10 | 10 |
|  | Co | <0.1 | <0.1 | <0.1 |
|  | Ni | 1 | 1 | 1 |
|  | Zn | <0.1 | <0.1 | <0.1 |
|  | Nb | 2 | 2 | 2 |
|  | Mo | <0.1 | <0.1 | <0.1 |
|  | Cu | <0.1 | <0.1 | <0.1 |
|  | Li | <0.1 | <0.1 | <0.1 |
| Bulk density |  | 3.20 | 3.27 | 3.33 |
| Strength (MPa) |  | 890 | 880 | 970 |
| Corrosion speed (μm/hr) |  | 9 | 4 | 6 |

TABLE 6

|  |  | Comparative Example 1 | Comparative Example 2 | Comparative Example 3 | Example 1 |
|---|---|---|---|---|---|
| Impurity metal (weight ppm) | Na | 1 | 0.5 | 10 | 2 |
|  | Al | 3 | 8 | 110 | 17 |
|  | K | 1 | 0.6 | 10 | 4 |
|  | Ca | 1 | 0.6 | 10 | 9 |
|  | Ti | 1 | 1 | 1 | <1 |
|  | V | <0.1 | <0.1 | <0.1 | <0.1 |
|  | Cr | <0.1 | <0.1 | 2 | 2 |
|  | Mn | <0.1 | <0.05 | 0.1 | 0.1 |
|  | Fe | 1 | 0.2 | 10 | 7 |
|  | Co | <0.1 | <0.01 | <0.01 | <0.01 |
|  | Ni | <0.1 | <1 | <1 | <1 |
|  | Zn | <0.1 | 0.5 | 0.5 | 0.5 |
|  | Nb | <0.1 | 4 | 4 | 3 |
|  | Mo | <0.1 | 0.1 | 0.1 | 0.03 |
|  | Cu | <0.1 | <0.01 | <0.1 | <0.1 |
|  | Li | <0.1 | 0.6 | 10 | 5 |
|  | Mg | <0.1 | 0.2 | 10 | <1 |
| Bulk density |  | 2.33 | 2.20 | 3.49 | 3.49 |
| Strength (MPa) |  | 100 | 70 | 860 | 860 |
| Corrosion speed (μm/hr) |  | 28 | 20 | 14 | 6 |

TABLE 7

|  |  | Example 5 | Example 6 | Example 7 |
|---|---|---|---|---|
| Impurity metal (weight ppm) | Na | 3 | 1 | 1 |
|  | Al | 10 | 6 | 5 |
|  | K | 2 | 1 | 1 |
|  | Ca | 4 | 3 | 4 |
|  | Ti | 0.1 | 0.1 | 0.1 |
|  | V | <0.1 | <0.01 | <0.01 |
|  | Cr | 6 | 0.3 | 0.3 |
|  | Mn | <0.1 | <0.01 | <0.01 |
|  | Fe | 3 | 5 | 5 |
|  | Co | <0.1 | <0.01 | <0.01 |
|  | Ni | 2 | <0.05 | <0.05 |
|  | Zn | 0.4 | 0.3 | 0.3 |
|  | Nb | 2 | 6 | 7 |
|  | Mo | <0.1 | <0.1 | <0.1 |
|  | Cu | <0.1 | <0.1 | <0.1 |

TABLE 7-continued

|  | | Example 5 | Example 6 | Example 7 |
|---|---|---|---|---|
|  | Li | <0.1 | <0.1 | <0.1 |
|  | Mg | 1 | 2 | 1 |
| Bulk density | | 3.12 | 3.21 | 3.26 |
| Strength (MPa) | | 890 | 910 | 810 |
| Corrosion speed (μm/hr) | | 8 | 5 | 5 |

TABLE 8

|  |  | Example 8 | Example 9 |
|---|---|---|---|
| Impurity (weight ppm) | Na | 1 | 1 |
|  | Al | 6 | 6 |
|  | K | 1 | 1 |
|  | Ca | 3 | 4 |
|  | Ti | 0.1 | 0.1 |
|  | V | <0.01 | <0.01 |
|  | Cr | 0.3 | 0.3 |
|  | Mn | <0.01 | <0.01 |
|  | Fe | 6 | 6 |
|  | Co | <0.01 | <0.01 |
|  | Ni | <0.05 | <0.05 |
|  | Zn | 0.3 | 0.3 |
|  | Nb | 5 | 10 |
|  | Mo | <0.1 | 0.03 |
|  | Cu | <0.1 | <0.1 |
|  | Li | <0.1 | <0.05 |
|  | Mg | <0.1 | 0.08 |
| Bulk density |  | 3.29 | 3.21 |
| Strength (MPa) |  | 690 | 750 |
| Corrosion speed (μm/hr) |  | 5 | 8 |

The corrosion speed of the specimen according to the comparative example 1 was high. The silicon nitride sintered body according to the comparative example 3 showed an increase of impurity metal element amount in the sintered body, even if high purity materials were used as silicon nitride raw materials, yttria raw materials and ytterbia raw materials. This reason was unknown. Particularly, an amount of aluminum was increased to 110 weight ppm. Moreover, this sintered body was corroded relatively at rapid speed by a plasma of fluorine-based gases.

On the contrary, if use was made of the nylon coated balls, an amount of impurity metal elements in the sintered body was not increased as compared with the raw materials, and it was possible to suppress an amount of respective impurity metal elements to a level of not more than 10 weight ppm. Moreover, it was understood that this sintered body had an extremely high corrosion resistance for plasma of fluorine-based gasses.

As mentioned above, the corrosion-resistive ceramic materials according to the invention has a high purity and shows a high corrosion resistance with respect to corrosive substances such as fluorine-based gasses or its plasma. Therefore, the corrosion-resistive ceramic materials according to the invention are suitable for semiconductor manufacturing articles extremely.

What is claimed is:

1. A corrosion-resistive ceramic material to be exposed to a corrosive gas, comprising a silicon carbide sintered body, wherein a percentage of respective metal elements, other than Si and a metal element constituting a sintering agent, is less than or equal to 10 weight ppm, and wherein said silicon carbide sintered body further comprises carbon and boron carbide or boron nitride.

2. The corrosion-resistive ceramic material according to claim 1, wherein the corrosive gas is a halogen-based corrosive gas or a plasma of the halogen-based corrosive gas.

3. A semiconductor manufacturing member comprising a base member made of the corrosion-resistive ceramic material of claim 1.

4. A corrosion-resistive ceramic material to be exposed to a corrosive gas, comprising a silicon nitride sintered body, wherein a percentage of respective metal elements, other than Si and a metal element constituting a sintering agent, is less than or equal to 10 weight ppm, and wherein said metal element constituting said sintering agent is selected from the group consisting of magnesium, silicon, yttrium, zirconium, and lanthanide series elements.

5. The corrosion-resistive ceramic material according to claim 4, wherein the corrosive gas is a halogen-based corrosive gas or a plasma of the halogen-based corrosive gas.

6. A semiconductor manufacturing member comprising a base member made of the corrosion-resistive ceramic material of claim 4.

* * * * *